US005622034A

United States Patent [19]
Dommert

[11] Patent Number: 5,622,034
[45] Date of Patent: Apr. 22, 1997

[54] CHOPPER APPARATUS FOR CANE STALK HARVESTER

[75] Inventor: Karl Dommert, Trussville, Ala.

[73] Assignee: Cameco Industries, Inc., Thibodaux, La.

[21] Appl. No.: 430,597

[22] Filed: Apr. 28, 1995

[51] Int. Cl.⁶ .................................................. F16D 43/21
[52] U.S. Cl. ........................ 56/11.7; 56/16.4 D; 56/502; 56/500; 56/DIG. 6; 192/56.6; 192/53.6; 464/46
[58] Field of Search ............................. 56/117, 16.4 D, 56/500, 502, 503, 504, DIG. 6; 464/46; 192/56.6, 53.6

[56] References Cited

U.S. PATENT DOCUMENTS

| | | | |
|---|---|---|---|
| 2,504,328 | 4/1950 | Hansen | 56/60 X |
| 2,755,912 | 7/1956 | Ashton | 198/184 |
| 2,835,298 | 5/1958 | Collins | 146/117 |
| 3,141,281 | 7/1964 | Gaunt et al. | 56/16 |
| 3,377,785 | 4/1968 | Kessler | 56/16 |
| 3,397,520 | 8/1968 | Johnston et al. | 56/1 |
| 3,422,906 | 1/1969 | Bunting et al. | 172/9 |
| 3,473,308 | 10/1969 | Zagorski et al. | 56/63 |
| 3,482,690 | 12/1969 | Driller | 209/147 |
| 3,599,404 | 8/1971 | Fernandez et al. | 56/12.8 |
| 3,673,774 | 7/1972 | Mizzi | 56/13.3 |
| 3,788,048 | 1/1974 | Stiff et al. | 55/406 |
| 3,830,046 | 8/1974 | Rollitt | 56/16.5 |
| 3,848,399 | 11/1974 | Makeham | 56/13.9 |
| 3,913,713 | 10/1975 | F'Geppert | 464/46 X |
| 3,958,397 | 5/1976 | Stiff | 56/60 X |
| 4,019,308 | 4/1977 | Quick | 56/13.9 |
| 4,065,912 | 1/1978 | Quick . | |
| 4,089,396 | 5/1978 | Quick . | |
| 4,121,778 | 10/1978 | Quick | 241/79 |
| 4,295,325 | 10/1981 | Cannavan | 56/13.9 |
| 4,555,896 | 12/1985 | Stiff et al. | 56/13.9 |
| 4,889,218 | 12/1989 | Chasseguet et al. | 464/46 X |
| 4,921,083 | 5/1990 | Etscheidt et al. | 464/46 X |
| 5,081,385 | 1/1992 | Gajjar | 464/46 X |
| 5,092,110 | 3/1992 | Dommert | 56/12.8 |

*Primary Examiner*—Terry Lee Melius
*Assistant Examiner*—Christopher J. Novosad
*Attorney, Agent, or Firm*—Pravel, Hewitt, Kimball & Krieger

[57] ABSTRACT

A slip clutch and cutter blade apparatus for cane stalk harvesters provides a machine frame with a cutting mechanism in the form of cutter shafts powered by hydraulic motors. The cutter shafts have a plurality of knives thereon that pinch the cane therebetween as the shafts rotate to chop the cane wholestalks into billets. A flywheel is mounted on a flywheel shaft. A gearbox interfaces the flywheel and cutter blades. A flywheel clutch is used as a overload protection device for the chopper system. If overloading occurs, the flywheel slips and therefore limits the torque. The flywheel is placed on the bushing and clamped between the friction linings with the aid of the thrust plate, the cup springs, brake plate, brake plate cover, and bolts. The more the cup springs are compressed by the bolts; the higher the torque at which the flywheel slips.

16 Claims, 5 Drawing Sheets

CHOPPER APPARATUS FOR CANE STALK HARVESTER

BACKGROUND OF THE INVENTION

1. Field of the Invention

The present invention relates to cane harvesting equipment and more particularly to an improved chopper harvester having rotary knives for cutting cane whole stalks into short pieces or "billets", wherein the knives rotate with a flywheel and clutching apparatus that is environmentally sealed and easily adjustable after quick visual inspection of the clutch assembly.

2. General Background

Sugar cane harvesters are large powered, mobile machines that can harvest one or two rows of standing cane while advancing quickly through the cane. Sugar cane is a very substantial crop to harvest. Sugar cane stalks generally stand between about five and eighteen feet (15;–18') high. The cane stalks are thick (about 1.5–2.0 inches in diameter) and carry bulky leafy material.

Many commercially available harvesters cut the cane at its base, and "top" the stalk by cutting off the upper leafy part of the stalk. The so called "wholestalk harvester" piles the cut cane in the field where it is picked up later with other equipment, loaders and cane carts.

Another type of cane harvester is called a chopper harvester. Chopper harvesters can also harvest one or two rows of sugar cane at a time. Chopper harvesters cut the cane at its base with a basecutter blade. They also slice the top off the cane stalks with a "topper". The remaining stalk is then chopped with hydraulically driven rotary knives into short pieces or "billets".

There are various types of mechanized sugar cane harvesters that harvest the growing cane stalks by cutting the cane at its base, and then transferring the cut cane to a receptacle vehicle such as a cane wagon or cane cart. In the process, leafy trash material is removed from the stalks so that the trash is not carried to the mill. A powered extractor fan is positioned in the upper portion of a cleaning chamber or housing and above a cane billet feed path. An air outlet above the fan directs the discharging air and leafy trash. "Chopper harvester" sugar cane harvesters cut the cane wholestalks into short pieces or billets after a "topper" removes the upper leafy part of the stalk.

Early harvester mechanisms were often attached to a tractor or towed. Examples of early harvesters can be seen in The Ashton U.S. Pat. No. 2,755,912 entitled "Harvesting Mechanism"; the Collins U.S. Pat. No. 2,835,298 entitled "Rotary Cutting Mechanism", the Gaunt et al. U.S. Pat. No. 3,141,281 entitled "Machines For Harvesting Tall Row Crops".

In the Gaunt patent a tractor is shown with a harvesting machine attached to the side of the tractor and wherein rotating drums having knives thereon are used to cut the stalks into small pieces. The device is adapted for use with sugar cane as an example. The Kessler U.S. Pat. No. 3,377,785, the Johnston U.S. Pat. No. 3,397,520 and the Bunting U.S. Pat. No. 3,422,906 show other early harvesters.

A topper for use with the sugar cane harvester is the subject of U.S. Pat. No. 3,473,308 issued to Zagorski. A cutter, conveying rollers, and chopper drums are seen in a patent to Driller issued Dec. 9, 1969 entitled "Crop Harvester Material Distribution Apparatus", U.S. Pat. No. 3,482,690.

A sugar cane harvesting combine is shown in U.S. Pat. No. 3,599,404 which has a mobile chassis with a supporting framework and wheels, and adjustable cane top severing mechanisms consisting of a shielded disc with blades, and a hydraulic adjustment means with rods to direct the cane to the top cutting area, curved paddles to discharge the cane tops, and a stalk severing mechanism with oppositely rotating horizontal cutters on hydraulically controlled skids, and means of directing falling cane into the stalk cutting mechanism, with a series of conveying means to dispose of the cut cane.

The Mizzi U.S. Pat. No. 3,673,774 provides a sugar cane harvester that has cutters for removing cane tops and cutting the stalks which are conveyed to a chopper having a bladed and a slotted rotary interacting to cut the stalks into billets and deliver them to a cane cleaner of two parallel rotating drums which tear leaf from the billets and discharge them to an elevator, on which they are carried over parallel screws, alternate screws being oppositely wound and oppositely rotated, for pulling leafy matter from the billets before the billets are discharged on the elevator.

U.S. Pat. No. 3,848,399 entitled "Sugar Cane Harvesters" provides a harvester having twin contra-rotating base cutters feeding whole sticks to cane chopping apparatus which sub-divides the sticks. Each base cutter is in the form of a drum, open at one end and arranged with its open end facing downwards. Outwardly projecting blades are mounted at the open end of the drum. The blades are thereby downwardly offset from the closed end of the drum which reduces power consumption and causes less soil and sticks to be fed into the harvester with the cane sticks. The harvester has a plurality of conveying rollers and a pair of contra-rotating cane choppers that receive the cane from the rollers and chop it into billets. The contra-rotating choppers throw the billets into a primary elevator. As the billets fall into the top of the elevator onto the inlet of a secondary elevator they are subjected to an air blast from the blower to remove cane trash. The cane falls from the top end of the elevator into a trailer and is simultaneously subjected to an air current produced by a fan unit to remove any remaining trash.

The Quick U.S. Pat. No. 4,019,308 entitled "Base Cutting Apparatus For Sugar Cane Harvesters" shows a cane harvester having scrolls, base cutters, conveying rollers to convey cut cane upwardly and rearwardly through the harvester, a topper to cut the tops of cane stalks, contra-rotating drums having cutting knives thereon, and an extractor having a fan for removing trash.

Another Quick U.S. Pat. No. 4,121,778 provides an air intake for trash removal apparatus of a cane harvester. The air intake forms the lower portion of the housing of the trash removal apparatus and also serves to guide cane billets into the hopper of a pivotally mounted billet discharge conveyor. The air intake is formed as a deflectable air permeable curtain of perforated rubber sheeting which avoids both damage to the air intake and jamming of the conveyor during use. Another version of the air intake includes hanging chains through which air can pass.

The Canavan U.S. Pat. No. 4,295,325 entitled "Sugar Cane Harvester" provides a self-propelled harvester having a base cutter for cutting cane near the ground level, a chopping cutter for cutting the stalks into billets, a feed for feeding the stalks from the base cutter to the chopping cutter and means for elevating and discharging the billets, the chopping cutter and elevating means including a rotary cutter with a knife blade on a rotating shaft and a thrower having a vane extending from the thrower shaft, the two shafts being parallel and contra-rotated, the cutter knife blade and vane co-acting to sever cane fed into the chopping cutter into billets, the thrower vane acting to throw the severed billets upwardly through a cane guide chute from which they are discharged, preferably into a bin mounted on the main frame and capable of being tilted to empty its contents.

It is known in the art to chop sugar cane into short stalks or billets and to also cut leafy trash material. Early Massey Ferguson U.S. Pat. Nos. 3,788,048 and 3,830,046 relate to sugar cane chopper harvesters that cut the cane stalks with a base cutter and then convey the stalks rearwardly in the harvester using conveying rollers, one of the sets of conveying rollers being a set of chopping rollers in the form of two rotating drums, each having knife blades thereon. The chopping drums rotate and cut the cane stalk and its attached leafy material into pieces. Thereafter, the cane billets or pieces fall into a hopper or receptacle, and the leafy trash material is separated from the crop with an extractor or cleaning chamber. U.S. Pat. Nos. 3,788,048 and 3,830,046 are hereby incorporated herein by reference.

There have been various attempts to improve the operation of sugar cane harvesters that use chopper knives including drum knife arrangements. Years ago Massey Ferguson manufactured and offered commercially a number of harvesters with base cutters to cut the cane stalks at their lower end or base, toppers to cut leafy material off the top of each cane stalk, conveying rollers to convey cane wholestalks rearwardly in the harvester, chopper rollers in the form of rotating drums having the cleaning chamber. The Massey Ferguson model 205 Sugar Cane Harvester is an example of such a prior art "chopper" type sugar cane harvester that is made generally in accord with the above discussed Massey Ferguson U.S. Pat. Nos. 3,788,078 and 3,830,046.

Austoft (formerly known as "Toft", "Versatile Toft", "Versatile Corporation" and "Toft Brothers") is an Australian company that has also manufactured and sold sugar cane harvesters that include a base cutter for cutting the cane stalks at the bottom, a topper for chopping the leafy material from the top of the cane stalks, conveying rollers for conveying cut cane stalks rearwardly in the machine, and a cutter for severing the cane stalks into a plurality of billets. Such "Austoft" or "Toft" models include 4000, 6000, 7000 and 7700 harvesters.

In the Versatile Corporation U.S. Pat. No. 4,555,896, issued to Stiff et al., there is provided a sugar cane harvester in which chopped crop is conveyed from a chopping mechanism to a cleaning mechanism.

The assignee of the present application, Cameco Industries, Inc., has sold "chopper" sugar cane harvesters under the model numbers 1000, CH2500 CHT2500 and CHW2500. U.S. Pat. No. 5,092,110 assigned to Cameco relates to a Primary Extractor Apparatus that has been used on the Cameco model CH2500 harvesters. CH2500 series harvesters have been on sale since about 1990.

One of the problems facing the billet or chopper type harvester is that of efficiently chopping cane wholestalks into pieces. These stalks carry much unwanted vegetation, primarily leafy matter. They also carry dirt, mud and/or small pebbles. This combination creates terrible wear problems for the machinery that is a part of the cane stalk chopping mechanism that creates the desirable "billets" of cane.

Another problem that plaques chopper harvesters is vibration. The knives that cut large stalks of cane into short pieces generate a terrific amount of stress and vibration. This vibratory force can loosen mechanical parts.

One such part that is subjected to all of these environmental problems is the clutch apparatus that works in concert with the chopping blades, the rotating blade drive shafts, and the associated flywheel. The flywheel has a tensioning or clutch mechanism. A farmer must properly adjust the tensioning or clutch mechanism if the machine is to operate properly and avoid undue wear.

In summary, the clutch portion of the rotary knife drive mechanism on chopper type sugar cane harvesters is subject to water (because of weather and washdown), dirt, mud, pebbles and vibration.

SUMMARY OF THE INVENTION

The present invention provides a sealed, waterproof clutch apparatus for use as an assembly with sugar cane harvester chopper blades and associated flywheel. The apparatus of the present invention protects its compression springs and its sliding and rotating elements from being exposed to the environment, weather, or washdown.

With the present invention, settings may be adjusted externally of any of the rotating mechanisms or compression components without breaking the environmental seal, thus protecting the mechanism.

The design of the present invention allows visual inspection for proper adjustment setting, without the use of any tools or measurement devices.

The present invention provides a tensioning mechanism that is self-indicating, making it easy to determine when clutch is in need of adjustment.

The present invention includes tensioning screws that are prevented from vibrating loose (and varying the settings of the clutch) by a combination of low ramp angle, spring force and rubber washers.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
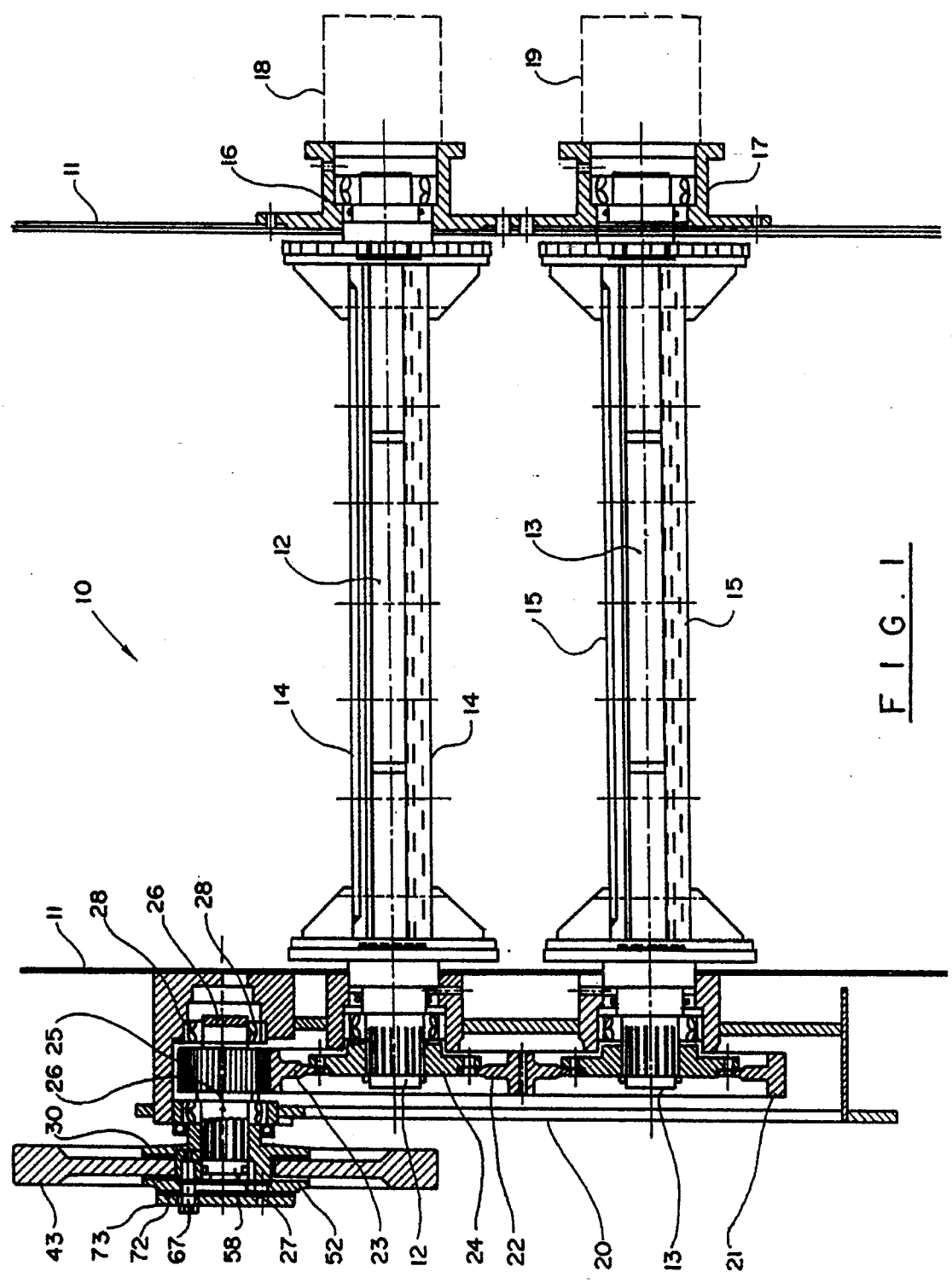
FIG. 1 is a sectional elevational view of the preferred embodiment of the apparatus of the present invention.
Figure 2:
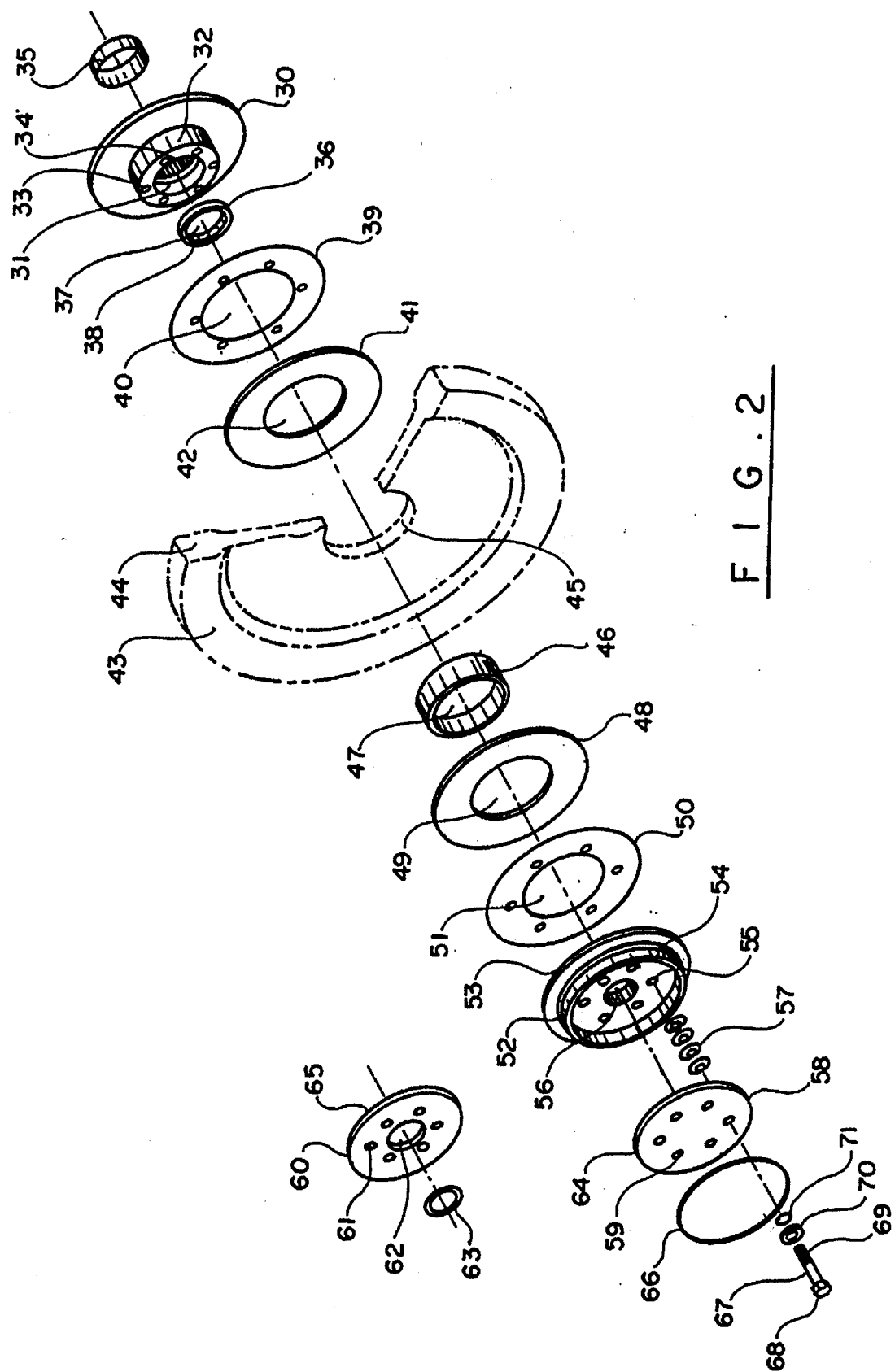
FIG. 2 is a perspective exploded view of the apparatus of the present invention.

FIGS. 1–4 show generally the preferred embodiment of the apparatus of the present invention, designated generally by the numeral 10. Harvester cutting and clutch assembly 10 is mounted to the harvester frame 11. A pair of chopper shafts 12, 13 are mounted in generally parallel spaced apart position relative to one another. Each of the chopper shafts 12, 13 provides a plurality of cutting knives 14, 15 respectively.

The chopper shafts and their cutting knives 14, 15 are rotated by a pair of hydraulic motors 18, 19, each interfaced with the chopper shaft 12, 13 at motor mounts 16, 17 respectively. The knives 14, 15 pinch (see FIG. 4) the cane wholestalk when they align. Gear case assembly 20 transmits rotary power between the chopper shafts 12, 13 and fly wheel 43 together with its clutch. A clutch apparatus (see FIGS. 2–3 and 5) forms an interface between fly wheel 43 and the cutting knife chopper shafts 12, 13.

Gear case assembly 20 includes a pair of gears 21–22, a pair of gear adaptors 24 mounted respectively on chopper shafts 12, 13, and a pinion gear 25 that is mounted on stub shaft 26. The gear 22 engages and interfaces with the pinion gear 25 at interface 23. It should be understood however, that either a stub shaft 26 or a through shaft 26A (see FIG. 3) can be used with the apparatus 10 of the present invention. Each shaft 26, or 26A (depending upon whether a stub shaft or a through shaft is to be used) has a spline 27 provided on the shaft 26, 26A for engaging clutch break hub 30. Bearing 28 is held by gear case 20 and supports stub shaft 26 or through shaft 26A.

External threads 29 on the selected shaft 26 or 26A form a connection with internal threads 38 of hub retainer nut 36. The hub retaining nut 36 has an open center 37 for receiving the selected shaft 26, 26A.

Clutch break hub 30 has an open center 31 and an annular shoulder portion 32. Annular shoulder portion 32 provides a plurality of circumferentially spaced internally threaded openings 33, each of which receives an adjusting bolt 67. Clutch break hub 30 has a splined portion 34 that engages the spline 27 of shaft 26 or (26A). Sleeve seal ring 35 extends about hub 30 at seal 30A adjacent bearing 28.

Figure 3:
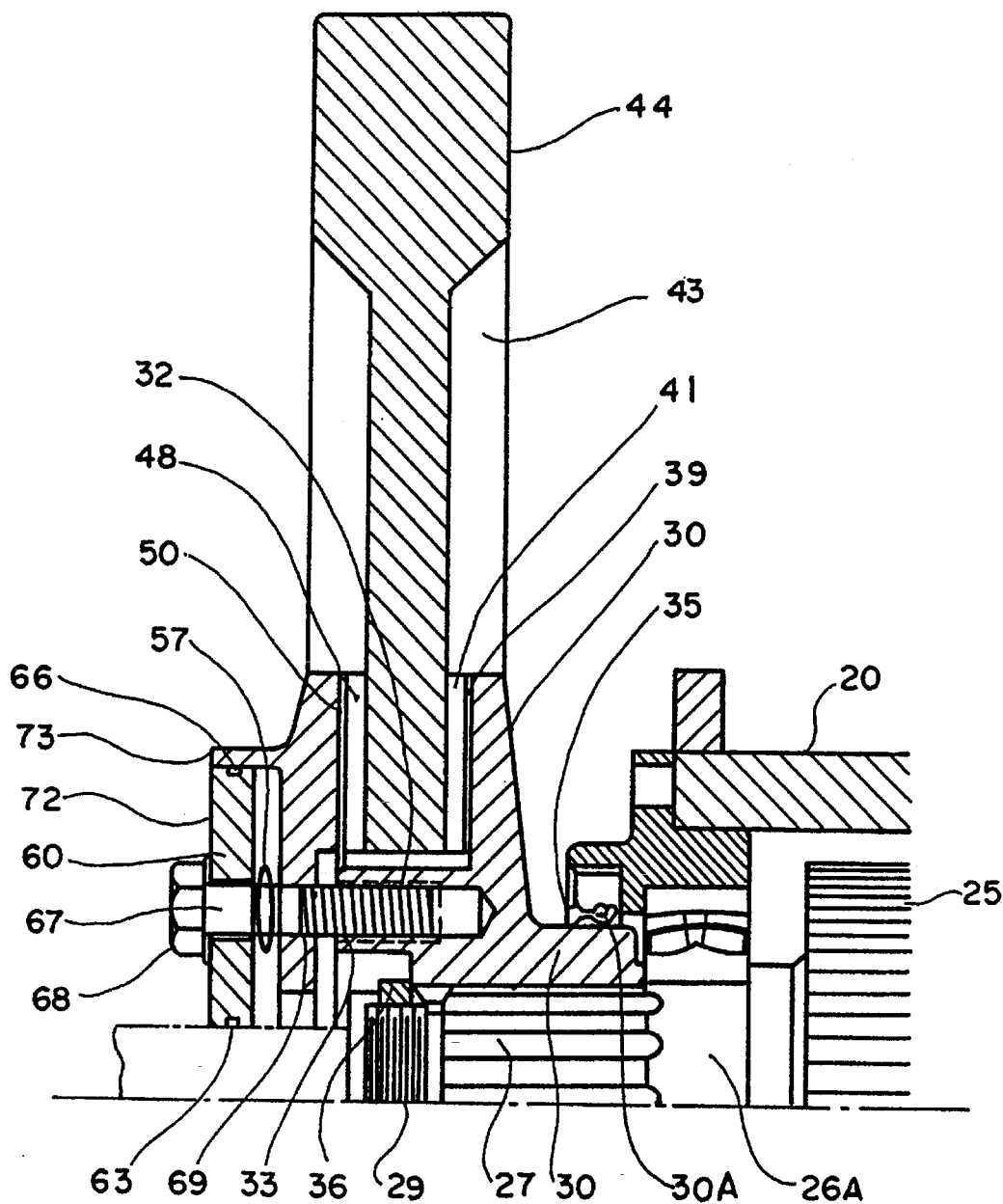
FIG. 3 is a fragmentary, elevational view of the preferred embodiment of the apparatus of the present invention.
Figure 4:
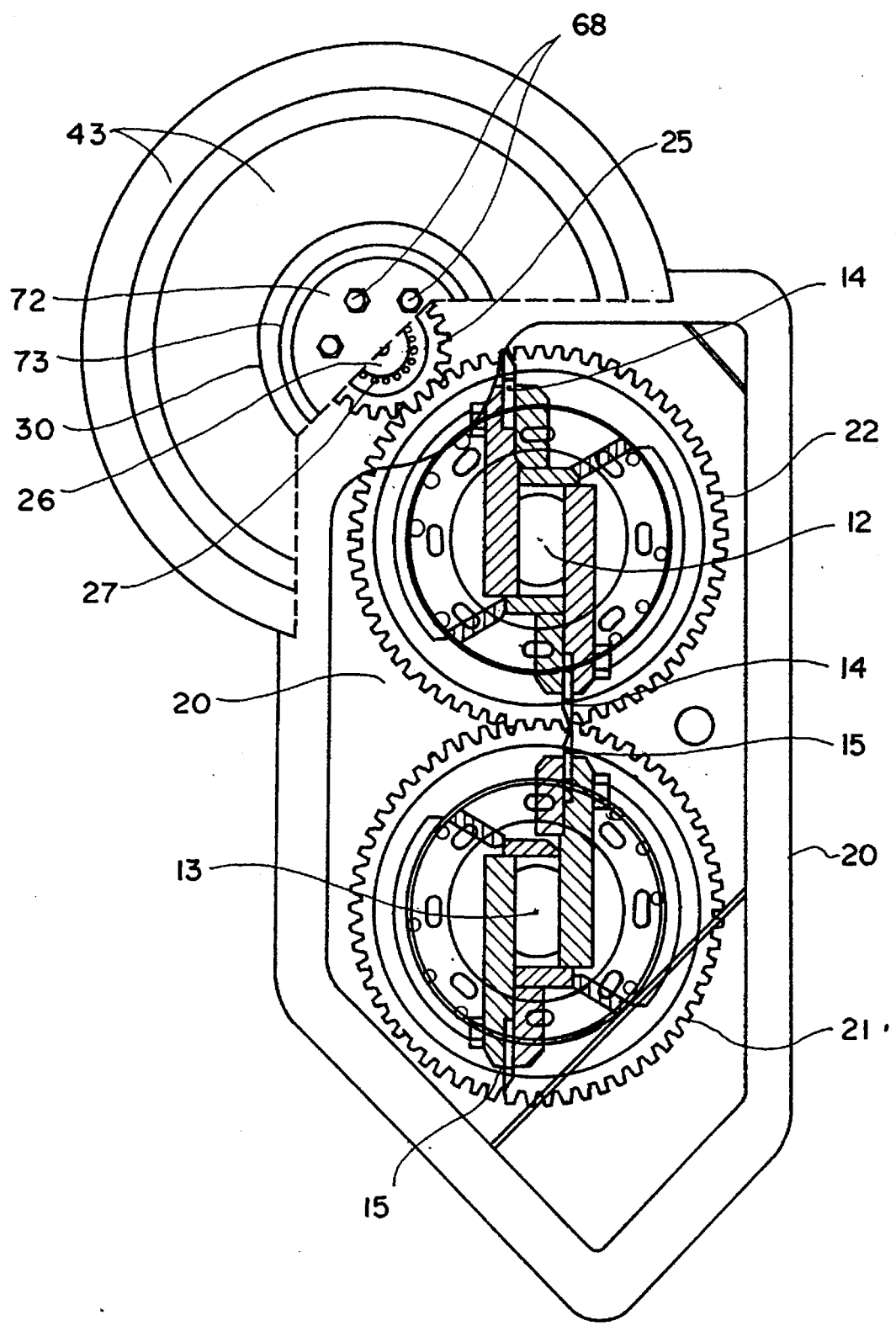
FIG. 4 is a partial sectional side view of the preferred embodiment of the apparatus of the present invention.

Metal plate liner 39 has an open center 40. Friction lining 41 likewise has an open center 42. A second friction lining 48 provides an open center 49. A second metal plate liner 50 provides an open center 51. The combination of metal plate liners 39, 50 and friction linings 41, 48 sandwich fly wheel 43 therebetween as shown in FIGS. 3–4. Fly wheel 43 has an open center 45 that receives selected shaft 26, 26A. Fly wheel 43 has a thickened periphery 44 that generates the desired inertia during use. Brake plate 52 fits against metal plate liner 50 upon assembly. Brake plate 52 has a periphery 53 and an open center 56. A bushing 46 with open center 47 can be placed between the selected shaft 26 or 26A and flywheel 43.

Figure 5:
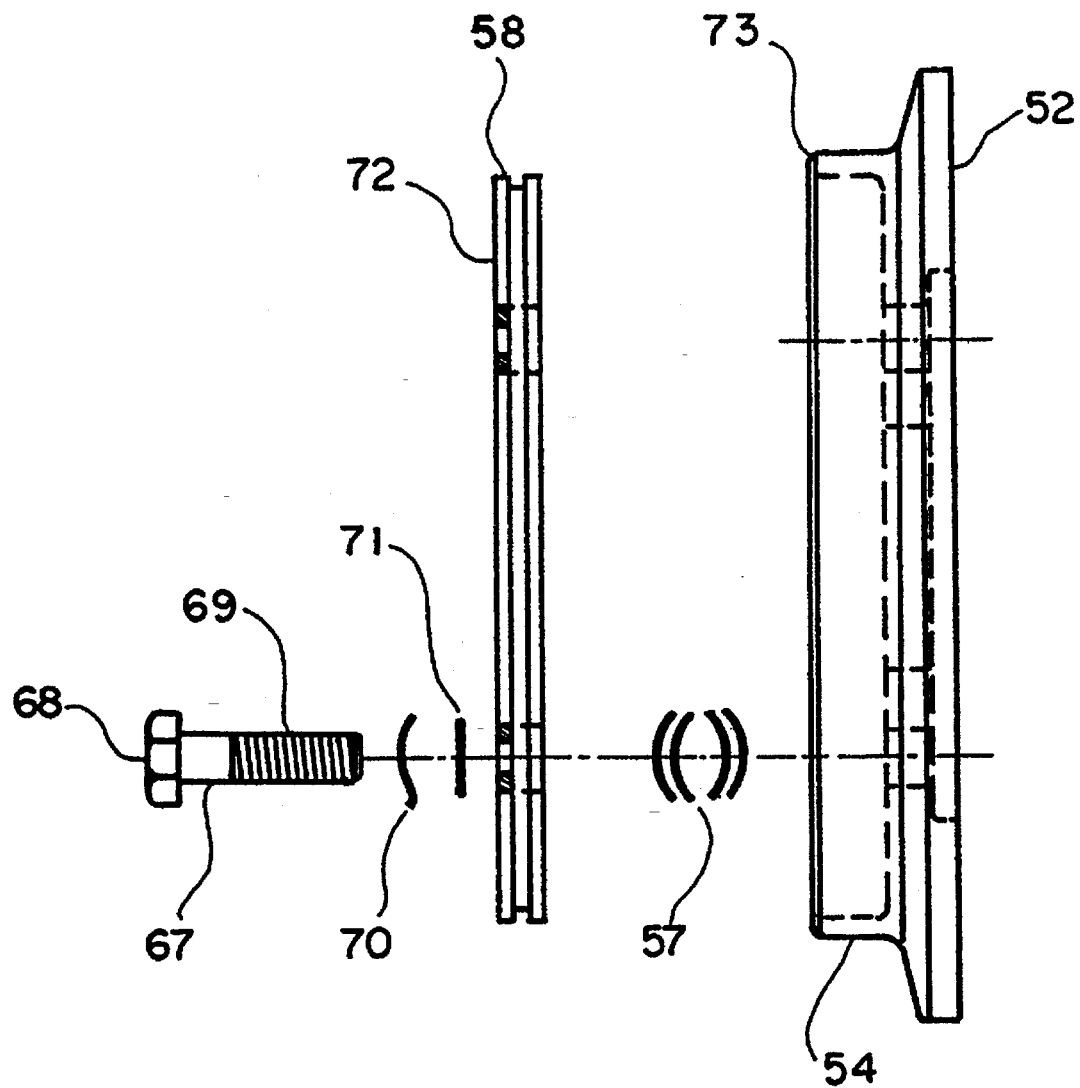
FIG. 5 is a fragmentary view of the preferred embodiment of the apparatus of the present invention illustrating the brake hub and brake plate portions thereof.

An annular shoulder 54 extends from one side of brake plate 52. The annular shoulder 54 is spaced inwardly from periphery 53. A plurality of openings 55 are positioned circumferentially about brake plate 52, spaced radially between open center 56 and annular shoulder 54. A plurality of spring cup type or "bellville" washers 57 are positioned between brake plate 52 and pressure plate cover 58 (see FIGS. 3 and 5). A plurality of four spring cup washers are carried by each adjusting bolt 67, located on bolt 57 at a position between the brake plate 52 and pressure plate cover 58. The washers 57 are arranged in opposing pairs so that the concave surface of the inner two washers face each other and the concave surface of the outer two washers abuts against the convex surface of the inner two washers respectively as shown in FIG. 5. This produces a spring action that loads the friction linings 41, 48 against flywheel 43 once the assembly bolts 67 are tightened.

A pair of pressure plate covers 58, 60 are shown in the drawings. The pressure plate cover 58 does not have an open center. It is the pressure plate cover 58 that is used with stub shaft 26. The pressure plate cover 58 provides a plurality of circumferentially spaced openings 59 that are equidistant from the center of pressure plate cover 58.

The pressure plate cover 60 has an open center 62 that accommodates a through shaft 26A. Likewise, the pressure plate cover 60 provides a plurality of radially spaced openings 61 for receiving adjusting bolts 67 upon assembly.

Each of the pressure plate covers 58, 60 provides a periphery 64, 65 respectively, that is shaped with a groove (see FIG. 5) to receive an O-ring 66. An O-ring 63 is provided for the pressure plate cover 60 to form a seal between open center 62 and through shaft 26A. O-ring 66 forms a peripheral seal between the periphery 64, 65 of the selected plates 58, 60 and annular shoulder 54 of brake plate 52. The O-ring 66 is thus positioned between the selected plate 58 or 60 and the annular shoulder 54 upon assembly.

A plurality of six adjustment bolts 67 are provided. Each bolt 67 has an enlarged head 68 and a externally threaded shank 69. Spring cup washer 70 and O-ring 71 can be positioned on adjusting bolt 67 between enlarged head 68 and the selected pressure plate cover 58 or 60.

During use, the apparatus 10 of the present invention allows the user to easily and quickly adjust the tension on the clutch 43 without the need to disassemble. Further, the apparatus 10 of the present invention provides a totally sealed water-proofed design that prevents the compression washer springs 57 or any of the sliding or rotating elements from being exposed to weather or wash down.

The setting of adjustment bolts 67 is external to any of the rotating mechanisms or compression components without the need to break the environmental seal thus protecting the internal mechanism.

The tensioning or adjustment bolts 67 are prevented from vibrating loss and varying the settings of the clutch 10 by a combination of low ramp angle and the spring force. The properly adjusted clutch 10 is shown in FIGS. 1 and 3. Notice that the O-ring 66 and the selected pressure plate 58 or 60 are so positioned that the pressure plate 58 or 60 external surface 72 aligns with the extreme external end 73 of annular shoulder 54 of brake plate 52. As the friction linings 41, 48 wear away, they will reduce in thickness. This will cause the surface 73 to move away from the surface 72. The user notices this misalignment and simply tightens the adjustment bolts 67 until the surface of 72 and 73 are flush again as shown in FIG. 1 and 3.

The following table lists the parts numbers and parts descriptions as used herein and in the drawings attached hereto.

PARTS LIST

| Part Number | Description |
| --- | --- |
| 10 | harvester cutting and clutch assembly |
| 11 | frame |
| 12 | chopper shaft |
| 13 | chopper shaft |
| 14 | cutting knife |
| 15 | cutting knife |
| 16 | motor mount |
| 17 | motor mount |
| 18 | hydraulic motor |
| 19 | hydraulic motor |
| 20 | gearcase assembly |
| 21 | gear |
| 22 | gear |
| 23 | interface of gears |

-continued

| Part Number | Description |
| --- | --- |
| 24 | gear adapter |
| 25 | pinion gear |
| 26 | stub shaft |
| 26A | through shaft |
| 27 | spline |
| 28 | bearing |
| 29 | external threads |
| 30 | clutch brake hub |
| 30A | seal |
| 31 | open center |
| 32 | annular shoulder |
| 33 | internally threaded opening |
| 34 | splined section |
| 35 | sleeve seal ring |
| 36 | hub retaining nut |
| 37 | open center |
| 38 | internal threads |
| 39 | metal plate liner |
| 40 | open center |
| 41 | friction lining |
| 42 | open center |
| 43 | flywheel |
| 44 | thickened periphery |
| 45 | open center |
| 46 | bushing |
| 47 | open center |
| 48 | friction lining |
| 49 | open center |
| 50 | metal plate liner |
| 51 | open center |
| 52 | brake plate |
| 53 | periphery |
| 54 | annular shoulder |
| 55 | opening |
| 56 | open center |
| 57 | belleville washers |
| 58 | pressure plate cover |
| 59 | opening |
| 60 | pressure plate cover |
| 61 | opening |
| 62 | open center |
| 63 | o-ring |
| 64 | periphery |
| 65 | periphery |
| 66 | o-ring |
| 67 | bolt |
| 68 | head |
| 69 | threaded shank |
| 70 | washer |
| 71 | o-ring |
| 72 | surface |
| 73 | surface |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A sugar cane harvester cutting knife and clutch assembly for chopping cane wholestalks into billets comprising:
   a) a harvester frame;
   b) a plurality of chopper shafts;
   c) a rotary flywheel rotatably supported upon the frame adjacent the chopper shafts;
   d) a pair of hydraulic motors for rotating the pair of chopper shafts;
   e) gearing means forming a mechanical interface between the flywheel and the chopper shafts;
   f) a plurality of knives mounted upon each of the chopper shafts for cutting cane wholestalks into billets;
   g) a clutch assembly positioned adjacent the flywheel for clutching same, said clutch assembly comprising:
      i) a pair of wear disks positioned on opposing sides of the flywheel;
      ii) a pair of locking disks associated respectively with the pair of wear disks, each wear disk being sandwiched between the flywheel and a locking disk;
      iii) a pair of annular members positioned on opposing sides of the pair of locking disks;
      iv) one of the annular members comprising an annular pressure plate disk with a generally cylindrically shaped annular shoulder, each annular member having a plurality of radially and circumferentially spaced openings;
      v) adjustment means, for controlling the compression load value applied by the wear disks to the flywheel, said adjustment means including spring means that applies pressure to the clutch wear disks, for locking the disks and flywheel together, said adjustment means including a environmentally sealed compartment that inhibits the travel of water, dirt, mud and pebbles to the spring means.

2. The apparatus of claim 1 wherein the wear disks are generally circular.

3. The apparatus of claim 1 further comprising a waterproof seal that prevents water travel to the springs.

4. The apparatus of claim 1 wherein said adjustment means comprises in part a brake plate that fits within the annular shoulder in face to face relation to one of the annular members.

5. The apparatus of claim 1 further comprising an O-ring fitted between the annular shoulder and one of the brake plates.

6. The apparatus us claim 1 wherein the annular shoulder extends at right angles from one of the annular members.

7. The apparatus of claim 1 wherein the adjustment means comprises a brake plate that is positioned within the annular shoulder of one of the annular members, a plurality of springs spaced circumferentially about an axis of rotation, and a plurality of assembly bolts for squeezing the brake plate and annular member together against the springs.

8. The apparatus of claim 7 wherein the bolts extend through the brake plate, one annular member, each locking disk and form a threaded attachment to the other annular member.

9. The apparatus of claim 8 wherein each spring has an open center that receives one of the bolts therethrough.

10. A sugar cane harvester cutting knife and clutch assembly for chopping cane wholestalks into billets comprising:
   a) a harvester frame;
   b) a plurality of chopper shafts having cutting knives thereon;
   c) a flywheel mounted for rotation on a flywheel shaft;
   d) gearing means forming a mechanical interface between the flywheel and the chopper shafts;
   e) a plurality of hydraulic motors for transmitting rotary power to the chopper shafts;
   f) the plurality of knives mounted upon the shafts for cutting cane wholestalks into billets;
   g) a clutch assembly positioned adjacent the flywheel for clutching same, said clutch assembly comprising:
      i) a pair of wear disks positioned on opposing sides of the flywheel;
      ii) a hub positioned on one side of the flywheel, one of the wear disks positioned between the hub and the flywheel;

iii) a pressure plate positioned on the opposite side of the flywheel from the hub; said pressure plate having a spring compartment;

iv) a pressure plate cover that defines a closure with the pressure plate to the spring compartment;

v) externally adjustable clutch pressure adjustment means for applying pressure to the flywheel and wear disks and including a plurality of springs for applying pressure to the clutch wear disks and flywheel;

vi) indicator means visible externally of the spring compartment for indicating to a user that the clutch wear disk pressure in is need of adjustment.

11. A sugar cane harvester cutting knife and clutch assembly for chopping cane wholestalks into billets comprising:

a) a harvester frame;

b) a plurality of powered shafts;

c) a flywheel;

d) gearing means forming a mechanical interface between the shafts and flywheel;

e) a plurality of knives mounted upon each of the shafts for cutting cane wholestalks into billets;

f) a clutch assembly positioned adjacent the flywheel for clutching same, said clutch assembly including:

i) a pair of wear disks positioned on opposing sides of the flywheel;

ii) a pair of locking disks associated respectively with the pair of wear disks, each wear disk being sandwiched between the flywheel and a locking disk;

iii) a hub assembly that includes a pair of hub members positioned on opposing sides of the pair of locking disks;

iv) one of the hub members comprising a hub disk, with an annular shoulder, each hub member having a plurality of radially and circumferentially spaced openings that align upon assembly so that adjusting bolts can be applied to the hub members at the openings;

v) a plurality of adjusting bolts, each having an enlarged head;

vi) means, including a plurality of springs, for applying tension to the clutch wear disks, locking disks and flywheel, said means including indicator means, visible to a user at the head of each bolt for indicating to a user that the clutch assembly is in need of adjustment.

12. A chopper harvester blade drive, comprising:

a) a machine frame;

b) a plurality of rotary cutting blades mounted upon the frame;

c) a flywheel mounted on a flywheel drive shaft;

d) hydraulic motors for rotating the cutting blades;

e) gearbox means for gearing the speed of the flywheel of the cutting blades, the gearbox means defining an interface between the flywheel drive shaft and cutting blades;

f) clutch means for clutching the connection between the flywheel and flywheel drive shaft, the clutch means comprising a series of annular disks affixed in face to face arrangement adjacent the flywheel, including at least one wearing disk that gradually wears during use so that it thins as wear occurs;

g) first and second annular members sandwiching the flywheel therebetween, the annular members including a first annular member having a plurality of circumferentially spaced openings surrounded by an annular shoulder that extends away from one side thereof and a second annular member with a corresponding plurality of openings that radially and circumferentially align with the openings of the first annular member;

h) a plurality of adjustment bolts that extend between the annular members forming a connection therebetween at the corresponding aligned openings;

i) spring means carried by each bolt for loading the annular members to engage the wearing disk and flywheel; and j) indicating means externally of the annular members for indicating to a user the degree of wear that has thinned the wearing disk.

13. The apparatus of claim 12 wherein there are a pair of wear disks on opposing sides of the flywheel.

14. The apparatus of claim 12 wherein one of the annular members provides a sealed compartment that holds the spring means.

15. The apparatus of claim 12 wherein one of the annular members is a hub having internally threaded openings that receive the adjustment bolts.

16. A chopper harvester blade drive, comprising:

a) a machine frame;

b) a plurality of rotary cutting blades mounted upon the frame;

c) a flywheel mounted on a flywheel drive shaft;

d) hydraulic motors for rotating the cutting blades;

e) gearbox means for gearing the speed of the flywheel of the cutting blades, the gearbox means defining an interface between the flywheel drive shaft and cutting blades;

f) clutch means for clutching the connection between the flywheel and flywheel drive shaft, the clutch means comprising a series of annular disks affixed in face to face arrangement adjacent the flywheel, including at least one wearing disk that gradually wears during use so that it thins as wear occurs;

g) first and second annular assemblies sandwiching the clutch means therebetween, the first annular assembly including a first circular brake plate assembly that includes a first plate having a plurality of circumferentially spaced openings therethrough and a second plate with a plurality of circumferentially spaced openings therethrough surrounded by an annular shoulder that extends away from one side of the second plate, and wherein the first plate is sized and shaped to nest within the annular shoulder;

h) the second annular assembly comprising a hub with a corresponding plurality of openings that radially and circumferentially align with the openings of the first and second shafts, said hub fitting the flywheel drive shaft for rotation therewith;

i) a plurality of bolts that extend between the annular assemblies forming a connection therebetween at the corresponding aligned openings;

j) spring means positioned between the first and second plates, for loading the disks to engage the wearing disk;

k) the position of the first plate relative to the annular shoulder defining means externally of the annular assemblies for indicating to a user the degree of wear that has thinned the wearing disk.

* * * * *